United States Patent
Lazar et al.

(10) Patent No.: US 11,418,862 B2
(45) Date of Patent: Aug. 16, 2022

(54) LINK FAULT MANAGEMENT FOR OPTICAL ADAPTERS

(71) Applicant: LENOVO Enterprise Solutions (Singapore) PTE. LTD., New Tech Park (SG)

(72) Inventors: Alexandru Lazar, Bucharest (RO); Corneliu-Ilie Calciu, Bucharest (RO); Radu Iorga, Bucharest (RO); Gavril-Ioan Florian, Ilfov (RO)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 216 days.

(21) Appl. No.: 16/912,355

(22) Filed: Jun. 25, 2020

(65) Prior Publication Data

US 2021/0409849 A1    Dec. 30, 2021

(51) Int. Cl.
*H04Q 11/00*    (2006.01)
*G06N 20/00*    (2019.01)
(Continued)

(52) U.S. Cl.
CPC .......... *H04Q 11/0066* (2013.01); *G06N 5/04* (2013.01); *G06N 20/00* (2019.01);
(Continued)

(58) Field of Classification Search
CPC ....... H04Q 11/0066; H04Q 2011/0081; H04Q 2011/0084; G06N 20/00; G06N 5/04; H04L 41/0681; H04L 41/147; H04L 41/16
(Continued)

(56) References Cited

U.S. PATENT DOCUMENTS 8,856,584 B2 * 10/2014 Matsubara .......... G06F 11/2002
                                                      714/4.11
10,891,560 B2 *  1/2021 Cagadas .............. G06N 20/00
(Continued)

FOREIGN PATENT DOCUMENTS

WO    WO-2016056002 A2 *  4/2016 ........... H04B 10/038

OTHER PUBLICATIONS

Francesco et al; A Tutorial on Machine Learning for Failure Management in Optical Networks; 2019; IEEE Xplore; pp. 1-15. (Year: 2019).*

(Continued)

*Primary Examiner* — Amritbir K Sandhu
(74) *Attorney, Agent, or Firm* — Kunzler Bean & Adamson; Bruce R. Needham

(57) ABSTRACT

An apparatus for optical link fault management includes a processor in a network device with an optical adapter of an optical link, and a memory that stores program code. The program code is executable by the processor to store state parameters from the optical adapter in a data log, input the state parameters from the data log into a failure prediction model, and generate, using the failure prediction model, a probability of failure of the optical adapter based on current state parameters from the data log. In response to the probability of failure reaching a failure threshold, the program code is executable by the processor to decrease data traffic in the optical link and to send an alert comprising the probability of failure. The failure threshold includes a probability of failure indicative of impending failure of the optical adapter.

18 Claims, 9 Drawing Sheets

(51) Int. Cl.
*G06N 5/04* (2006.01)
*H04L 41/16* (2022.01)
*H04L 41/147* (2022.01)
*H04L 41/0681* (2022.01)

(52) U.S. Cl.
CPC ........ *H04L 41/0681* (2013.01); *H04L 41/147* (2013.01); *H04L 41/16* (2013.01); *H04Q 2011/0081* (2013.01); *H04Q 2011/0084* (2013.01)

(58) Field of Classification Search
USPC ........................................................ 398/1–33
See application file for complete search history.

(56) References Cited

U.S. PATENT DOCUMENTS

| | | | |
|---|---|---|---|
| 2019/0377625 A1* | 12/2019 | Chintalapati | G06N 7/005 |
| 2020/0112489 A1* | 4/2020 | Scherger | G06F 11/3447 |
| 2021/0099897 A1* | 4/2021 | Ishikura | H04L 41/16 |
| 2021/0384969 A1* | 12/2021 | Kovsh | H04B 10/07955 |
| 2021/0409849 A1* | 12/2021 | Lazar | G06N 5/04 |

OTHER PUBLICATIONS

Francesco et al; A Tutorial on Machine Learning for Failure Management in Optical Networks, Aug. 2019; Journal of Light wave technology, vol. 37, No. 16; pp. 1-15. (Year: 2019).*
ResearchGate, Berghmans, et al., "An Introduction to Reliability of Optical Components and Fiber Optic Sensors", NATO Security through Science Series B: Physics and Biophysics, Dec. 2007, pp. 1-29.
Optics Express, Wang, et al., "Failure prediction using machine learning and time series in optical network", vol. 25, No. 16, Aug. 7, 2017, pp. 1-13.
IIT Research Institute, Steven Flint, "Failure Rates for Fiber Optic Assembles", RADC-TR-80-322, Oct. 1980, pp. 1-111.
ResearchGate, M. J. Matthewson, "Fiber Lifetime Predictions", Proceedings of SPIE—The International Society for Optical Engineering, SPIE vol. 1580 Fiber Optic Components and Reliability, Jan. 1991, pp. 1-14.
ResearchGate, M. John Matthewson, "Models for fiber reliability", Proceedings of SPIE—The International Society for Optical Engineering, SPIE vol. 1973, • Nov. 1993, pp. 1-11.
Willem Griffioen, "Optical Fiber Mechanical Reliability", Eindhoven University of Technology, Jan. 1, 1995, pp. 1-224.

* cited by examiner

US 11,418,862 B2

LINK FAULT MANAGEMENT FOR OPTICAL ADAPTERS

FIELD

The subject matter disclosed herein relates to optical adapters and more particularly relates to optical link fault management for optical adapters.

BACKGROUND

Optical link-related problems account for a significant proportion of downtime and manual maintenance cost in modern data centers. While optical link failure can be mitigated, to some degree, through link redundancy, unexpected failures do nonetheless trigger protocol-level topology re-computations, which can affect the available bandwidth or bring down services in case of multiple failures. A solution that reduces the frequency of optical link incidents in a data center or other locations with optical links will improve the services quality and predictability, and reduce the maintenance and support costs.

BRIEF SUMMARY

An apparatus for optical link fault management for optical adapters is disclosed. A method and computer program product also perform the functions of the apparatus. An apparatus for optical link fault management for optical adapters includes, in some embodiments, a processor in a network device with an optical adapter of an optical link, and a memory that stores program code. The program code is executable by the processor to store state parameters from the optical adapter in a data log, input the state parameters from the data log into a failure prediction model, and generate, using the failure prediction model, a probability of failure of the optical adapter based on current state parameters from the data log. In response to the probability of failure reaching a failure threshold, the program code is executable by the processor to decrease data traffic in the optical link and to send an alert comprising the probability of failure. The failure threshold includes a probability of failure indicative of impending failure of the optical adapter.

A method for optical link fault management for an optical adapter includes monitoring, by use of a processor, data traffic patterns for an optical link comprising an optical adapter, and storing, by use of a processor, state parameters from the optical adapter in a data log. The method includes inputting, by use of a processor, the state parameters from the data log into a failure prediction model and generating, by use of a processor and using the failure prediction model, a probability of failure of the optical adapter based on current state parameters from the data log. The method includes estimating, by use of a processor and based on the data traffic patterns, a time for corrective action for the optical adapter. The time for corrective action includes a time prior to a predicted failure based on the probability of failure. The method includes sending, by use of a processor, an alert with the probability of failure in response to the probability of failure reaching a failure threshold. The failure threshold includes a probability of failure indicative of impending failure of the optical adapter, where the alert includes an estimated time for the corrective action and the estimated time for the corrective action includes a time with a low amount of disruptiveness to data traffic.

A program product for optical link fault management for optical adapters includes a computer readable storage medium with program code. The program code is configured to be executable by a processor to perform operations that include storing state parameters from and optical adapter of an optical link in a data log, inputting the state parameters from the data log into a failure prediction model, and generating, using the failure prediction model, a probability of failure of the optical adapter based on current state parameters from the data log. The program code is configured to be executable by a processor to perform operations that include, in response to the probability of failure reaching a failure threshold, decreasing data traffic in the optical link and sending an alert comprising the probability of failure. The failure threshold includes a probability of failure indicative of impending failure of the optical adapter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
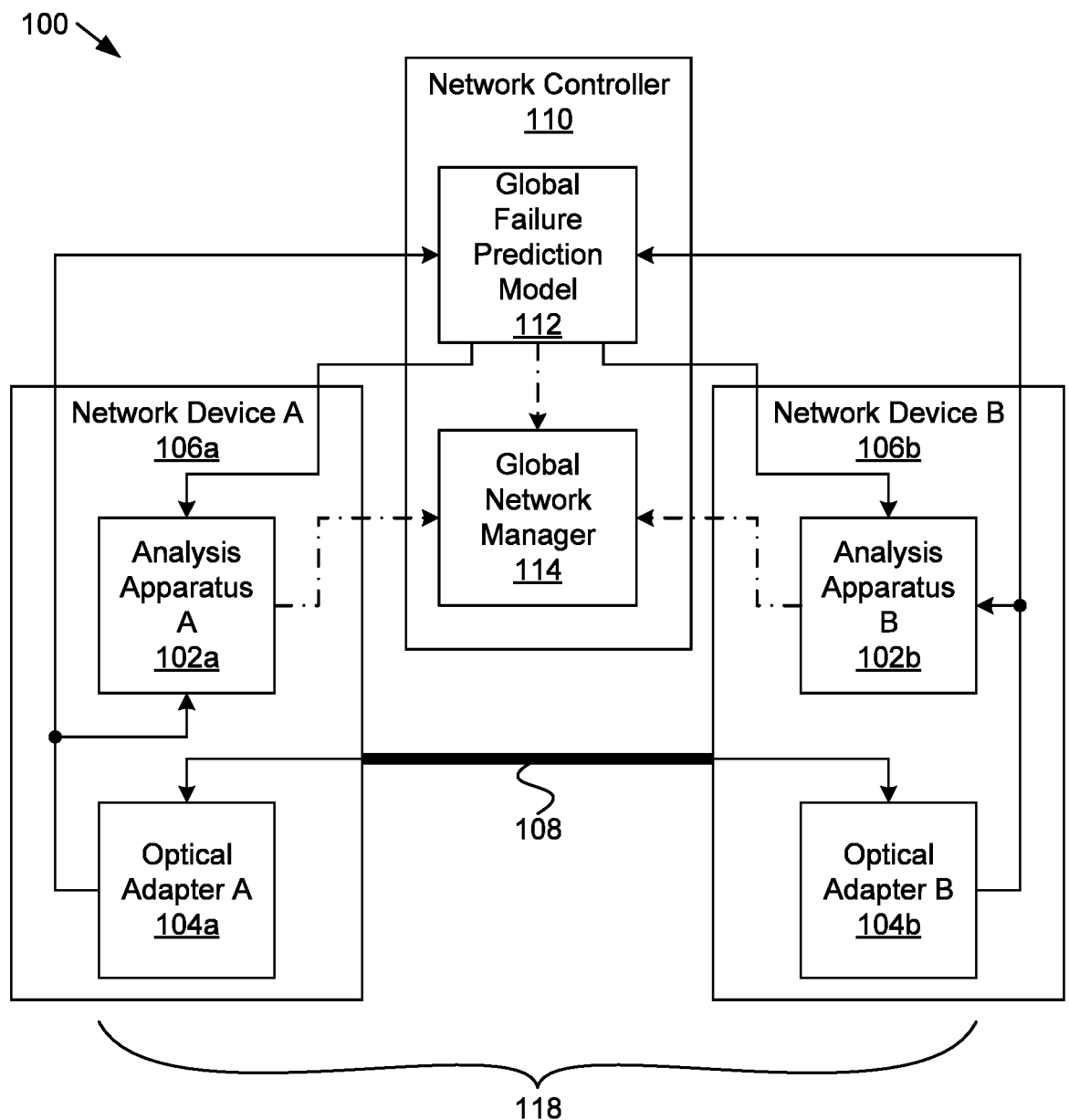
FIG. 1 is a schematic block diagram illustrating one embodiment of a system for management of optical adapters.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for optical link fault management for optical adapters is disclosed. A method and computer program product also perform the functions of the apparatus. An apparatus for optical link fault management for optical adapters includes, in some embodiments, a processor in a network device with an optical adapter of an optical link, and a memory that stores program code. The program code is executable by the processor to store state parameters from the optical adapter in a data log, input the state parameters from the data log into a failure prediction model, and generate, using the failure prediction model, a probability of failure of the optical adapter based on current state parameters from the data log. In response to the probability of failure reaching a failure threshold, the program code is executable by the processor to decrease data traffic in the optical link and to send an alert comprising the probability of failure. The failure threshold includes a probability of failure indicative of impending failure of the optical adapter.

In some embodiments, the program code is further executable by the processor to monitor data traffic patterns for the optical link and estimate, based on the data traffic patterns, a time for corrective action for the optical adapter of the optical link. The time for corrective action is a time prior to a predicted failure based on the probability of failure and the alert includes the time for the corrective action. In other embodiments, the estimated time for the corrective action includes a time with a low amount of disruptiveness to data traffic. In other embodiments, the program code to monitor data traffic patterns for the optical link includes determining a pattern comprising a time period of when data traffic to the optical link is low.

In some embodiments, decreasing data traffic in the optical link includes increasing a cost of using the optical link, where increasing the cost of using the optical link decreases data traffic to the optical link and increases data traffic to a redundant optical link. In other embodiments, the program code is further executable by the processor to gather failure data of a plurality of optical adapters and related state parameters of the plurality of optical adapters and to refine, using machine learning, the failure prediction model based on the failure data of the plurality of optical adapters and related state parameters of the plurality of optical adapters. In other embodiments, the network device includes the failure prediction model and a global network manager includes an additional failure prediction model. The gathered failure data of the plurality of optical adapters and related state parameters of the plurality of optical adapters is gathered at the global network manager which refines the failure prediction model at the global network manager. In the embodiment, the program code is further executable by the processor to receive model parameters from the global network manager and to modify the failure prediction model at the network device based on the refinements to the failure prediction model at the global network manager.

In some embodiments, the program code is further executable by the processor to determine a current link health, where the current link health is a function of the probability of failure of the optical adapter and a frame checksum error rate. In other embodiments, the program code is further executable by the processor to determine a current aggregated link health ("LHA"):

$$LHA = \max\left(0,\ 100 - \left(\frac{E_r}{L_{th}} \cdot 100\right)\right)$$

where $E_r$ is a frame checksum error rate, and $L_{th}$ is a frame checksum error threshold. In a further embodiment, the program code is further executable by the processor to determine a predicted aggregated link failure time that includes a predicted time when the LHA reaches zero. In another further embodiment, the program code is further executable by the processor to determine a link alert time which includes a predicted time when the LHA reaches an LHA threshold.

In some embodiments, the program code is further executable by the processor to determine a predicted link health alert time $T_{LHF}$ which is a predicted time of the probability of failure of the optical adapter reaching a probability of failure threshold independent of a frame checksum error rate. In other embodiments, the program code is further executable by the processor to determine a predicted link efficiency failure time $T_{LEF}(L_{TH})$ which includes a time when a frame checksum error rate of the optical adapter is predicted to reach a frame checksum error threshold independent of the probability of failure.

A method for optical link fault management for an optical adapter includes monitoring, by use of a processor, data traffic patterns for an optical link comprising an optical adapter, and storing, by use of a processor, state parameters from the optical adapter in a data log. The method includes inputting, by use of a processor, the state parameters from the data log into a failure prediction model and generating, by use of a processor and using the failure prediction model, a probability of failure of the optical adapter based on current state parameters from the data log. The method includes estimating, by use of a processor and based on the data traffic patterns, a time for corrective action for the optical adapter. The time for corrective action includes a time prior to a predicted failure based on the probability of failure. The method includes sending, by use of a processor, an alert with the probability of failure in response to the probability of failure reaching a failure threshold. The failure threshold includes a probability of failure indicative of impending failure of the optical adapter, where the alert includes an estimated time for the corrective action and the estimated time for the corrective action includes a time with a low amount of disruptiveness to data traffic.

In some embodiments, the method includes, in response to the probability of failure reaching the failure threshold, decreasing data traffic in the optical link. In other embodiments, decreasing data traffic in the optical link includes increasing a cost of using the optical link. Increasing the cost of using the optical link decreases data traffic to the optical link and increases data traffic to a redundant optical link.

In some embodiments, the method includes gathering failure data of a plurality of optical adapters and related state parameters of the plurality of optical adapters and refining, using machine learning, the failure prediction model based on the failure data of the plurality of optical adapters and related state parameters of the plurality of optical adapters. The failure prediction model is in a network device and a global network manager includes an additional failure prediction model. The gathered failure data of the plurality of optical adapters and related state parameters of the plurality of optical adapters are gathered at the global network manager which refines the failure prediction model at the global network manager. In the embodiment, the method includes receiving model parameters from the global network manager and modifying the failure prediction model at the network device based on the refinements to the failure prediction model at the global network manager.

In other embodiments, monitoring data traffic patterns for the optical link includes determining a pattern that includes a time period of when data traffic to the optical link is low. In other embodiments, the method includes determining a current aggregated link health ("LHA"):

$$LHA = \max\left(0, 100 - \left(\frac{E_r}{L_{th}} \cdot 100\right)\right)$$

wherein $E_r$ is a frame checksum error rate, and $L_{th}$ is a frame checksum error threshold. In the embodiment, the method includes determining a predicted aggregated link failure time that is a predicted time when the LHA reaches zero.

A program product for optical link fault management for optical adapters includes a computer readable storage medium with program code. The program code is configured to be executable by a processor to perform operations that include storing state parameters from and optical adapter of an optical link in a data log, inputting the state parameters from the data log into a failure prediction model, and generating, using the failure prediction model, a probability of failure of the optical adapter based on current state parameters from the data log. The program code is configured to be executable by a processor to perform operations that include, in response to the probability of failure reaching a failure threshold, decreasing data traffic in the optical link and sending an alert comprising the probability of failure. The failure threshold includes a probability of failure indicative of impending failure of the optical adapter.

FIG. 1 is a schematic block diagram illustrating one embodiment of a system 100 for management of optical adapters. The system 100 includes an analysis apparatus A 102a and an optical adapter A 104a in a network device A 106a and an analysis apparatus B 102b and an optical adapter B 104b in a network device B 106b connected by an fiber optic cable 108. The system 100 also includes a network controller 110 with a global failure prediction model 112 a global network manager 114 and an optical link 118 which are described in more detail below.

The analysis apparatuses 102a, 102b (collectively or generically "102") monitor optical adapters 104a, 104b (collectively or generically "104") of an optical link 118 to predict failures of the optical adapters 104. The optical link 118 includes two optical adapters 104a, 104b and a fiber optical cable 108 in between. Each analysis apparatus 102 includes a failure prediction model that receives input from the optical adapters 104, from the global failure prediction model 112 and global network manager 114 to predict failures of the optical adapters 104 prior to actual failure so that repair or replacement of the optical adapters 104 can be planned and executed at a convenient time and so that data traffic through the optical adapters 104 can be minimized or rerouted through other non-failing optical adapters (not shown). The analysis apparatus 102 with failure prediction models, the global failure prediction model 112 and global network manager 114 are described in more detail below with respect to FIGS. 2-4.

The optical adapters 104 are devices that connect to fiber optic cable 108 and to computing equipment and transmit data between the computing equipment. Typically, an optical adapter 104 converts a data packet from a computing device to an encoded optical signal and transmits the encoded optical signal over the fiber optic cable 108. An optical adapter 104 also typically receives and decodes an encoded optical signal to produce a data packet to be transmitted to a computing device. In some embodiments, the data packet is transmitted and received over a data cable, which may be copper or other media or metal that transmits a data packet.

An optical adapter (e.g. 104a) is a device that converts received digital signals transmitted electronically to optical signals which are transmitted to another optical adapter 104 (e.g. 104b) of the optical link 118 via a fiber optic cable 108. Optical adapters 104 also receive optical signals over the fiber optical cable 108 and convert the optical signals to digital signals that are transmitted electrically and forwarded to a computing device. An optical adapter 104, in some embodiments, is called an optical transceiver. Typically, an optical adapter 104 includes an optical transmitter to transmit optical signals and an optical receiver that receives optical signals. The optical adapters 104, in some embodiments, include a multiplexer ("MUX") and a demultiplexer ("DEMUX") that converts electrical signals that represent many bits to fewer channels. For example, a MUX may convert 1028 bit signals into four channels, each of a different wavelength. In some embodiments, the MUX is part of the optical transmitter and the DEMUX is part of the optical receiver. In other embodiments, the MUX and DEMUX are separate from the optical transmitter and receiver.

The optical adapters 104 typically include one or two optical ports. In embodiments with two optical ports, an optical adapter 104 is connected to a duplex cable with two fiber optic cables; one for signals going one way and the other for signals going the other way. For example, the fiber optic cable 108 of the optical link 118 may include two fiber optic cables bundled together. In other embodiments, the optical adapters 104 include a simplex cable that includes single optical port and optical signals are sent and received over a single fiber optic cable 108. In the embodiment, sending and receiving optical signals are done at different times.

The optical adapters 104 also include one or more connectors for electrical signals to the transmitter of the optical adapter 104 for conversion to an optical signal and from the receiver of the optical adapter 104 after being converted from an optical signal. For example, the optical adapters 104 may include one or more RJ45 connectors with category 5, category 5e category 6, etc. cable or the like that may include twisted, shielded pairs of copper cables. The optical adapters 104 may also include other connector types, such as a connection via traces on a circuit board, soldered connections, etc. The optical adapters 104 may include any type of connection capable of transmission of electrical signals to or from a computing device.

An optical adapter 104 typically includes a power supply that provides one or more voltages used within the optical adapter 104, such as 12 volts ("V") direct current ("DC"), 5 VDC, 24 V alternating current ("AC") voltage, etc. In some embodiments, the power supply receives AC power and converts the AC power to a different voltage and/or to one or more DC voltages. The power supply may include transient voltage surge suppression ("TVSS"), snubbers, filters, or the like.

An optical adapter 104 typically includes a controller that manages operations of the optical adapter 104. The controller may be a micro-controller, a processor, a field programmable gate array ("FPGA"), etc. The controller includes a capability to transmit state parameters associated with various data points of the optical adapter 104. For example, the controller may transmit data such as optical transmission power, signal strength of received optical signals, various temperatures, voltage spikes on the power supply, checksum errors, hours of operation of the optical adapter 104, and the like. The optical adapter 104 typically sends information useful in determining the health of the optical adapter 104, which is useful in projecting when the optical adapter 104 will fail. Typically, optical adapters in general make this health information available. However, current systems react to failures, which often negatively affects data flow. While several components of optical adapters 104 are mentioned above, other components present in the optical adapter 104 may also be present and may be monitored and the controller may provide data regarding any monitored component, measurement, etc. for use in predicting failure of the optical adapter 104.

The network device 106 includes an analysis apparatus 102 that stores state parameters from the optical adapter 104 in a data log, inputs the state parameters from the data log into a failure prediction model, and generates, using the failure prediction model, a probability of failure of the optical adapter 104 based on current state parameters from the data log. The analysis apparatus 102, in response to the probability of failure reaching a failure threshold, decreases data traffic in the optical link, and sends an alert that includes the probability of failure. The failure threshold includes a probability of failure indicative of impending failure of the optical adapter 104.

In some embodiments, the analysis apparatus 102 stores the state parameters from the optical adapter 104 in the data log periodically. The period for storing the state parameters may be every millisecond, every second, every minute, every few minutes, etc. In some embodiments, the analysis apparatus 102 stores the state parameters at a higher rate as certain state parameters change. For example, if an internal temperature of the optical adapter 104 rises, checksum errors increase, etc., the analysis apparatus 102 may increase a sampling rate of the state parameters. In other embodiments, the analysis apparatus 102 stores the state parameters as the state parameters are made available by the optical adapter 104. In other embodiments, the analysis apparatus 102 maintains a steady sampling rate of state parameters.

In some embodiments, the analysis apparatus 102 stores all state parameters made available by the optical adapter 104 and/or stores each instance that the state parameters are made available. In other embodiments, the analysis apparatus 102 includes a first-in-first-out ("FIFO") buffer that stores a particular amount of state parameters that are most current while oldest state parameters in the buffer are discarded as new state parameters are stored. In other embodiments, the analysis apparatus 102 includes a FIFO buffer and also periodically stores state parameters in another buffer at a slower rate. One of skill in the art will recognize other ways that the analysis apparatus 102 to sample and store state parameters of the optical adapter 104.

Figure 8:
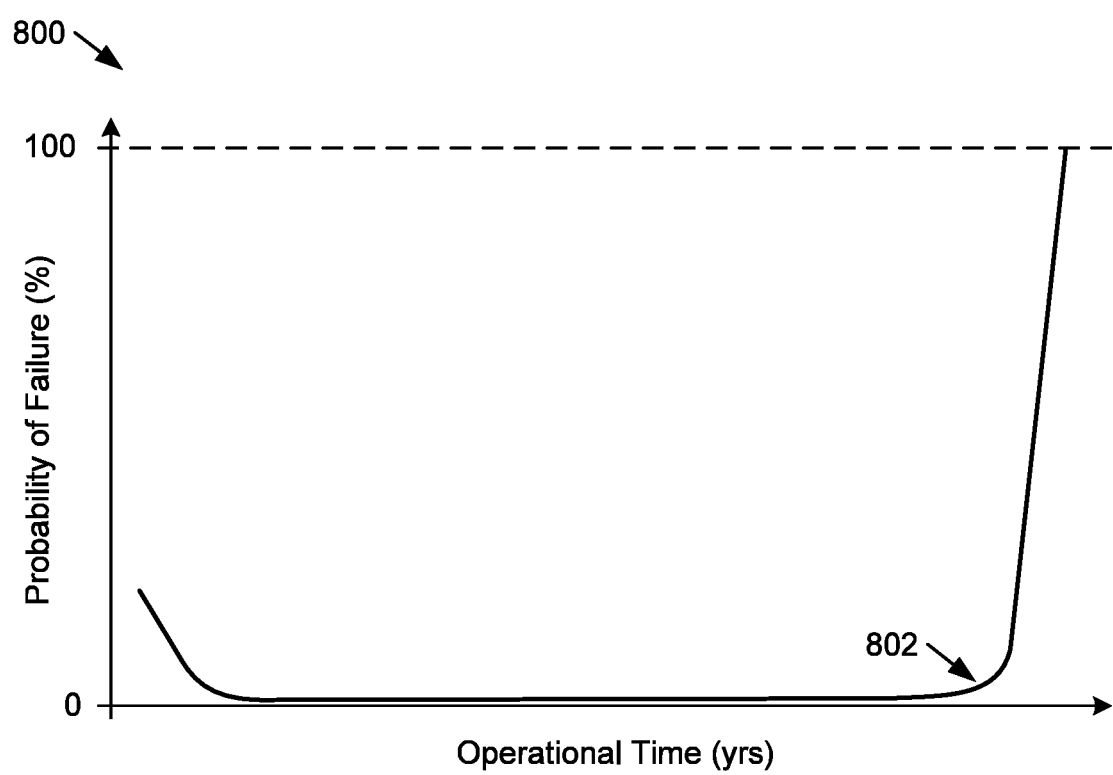
FIG. 8 is a typical failure profile of an optical adapter based on operational time.

The analysis apparatus 102 inputs the state parameters from the data log into a failure prediction model. The failure prediction model uses the state parameters to make various predictions with regard to failure of the optical adapter 104. Typically, an optical adapter 104 has a failure rate that is similar to the failure profile of FIG. 8. FIG. 8 is a typical failure profile 800 of an optical adapter 104 based on operational time. The failure profile 800 of FIG. 8 is typical of electrical components, computing components, etc. in that often there is an increased failure rate at the beginning of life of a component due to manufacturing issues, followed by a failure rate that is small for a long period of time, then an increased failure rate as the component ages. Prediction of where the knee 802 of the failure profile 800 is located or detection of an increased probability of failure toward an end-of-life of the component is useful in minimizing the effect of component failure on a system.

The failure prediction model uses state parameters in addition to adjust a failure profile similar to the failure profile 800 of FIG. 8. For example, if a network device 106 is located in a hot environment, the optical adapter 104 may fail sooner than an optical adapter 104 operating in a cooler environment. In other embodiments, where a power supply of an optical adapter 104 is connected to power source where voltage spikes are frequent, the voltage spikes may degrade the power supply, which may cause the power supply to fail prematurely so that the optical adapter 104 fails prematurely.

The failure prediction model uses state parameters indicative of eminent failure to provide a probability of failure. The failure prediction model may include a failure profile similar to FIG. 8, but may adjust the knee 802, the slope, radius of the knee 802, etc. based on actual state parameters to produce a more accurate probability of failure. As the probability of failure rises and reaches a failure threshold, the analysis apparatus 102 takes action to reduce data traffic in the optical link 118 and to send an alert regarding impending failure of the optical adapter 104. Various embodiments of the analysis apparatus 102 are described in more detail with regard to the apparatuses 200, 300 of FIGS. 2 and 3.

In some embodiments, the network device 106 includes a processor and memory and the analysis apparatus 102 is implemented in programmable code executable on the processor. In other embodiments, the analysis apparatus 102 is implemented with an FPGA or other programmable hardware device. In other embodiments, all or part of the analysis apparatus 102 is embodied by hardware circuits.

The system 100 includes a network controller 110 that includes a global failure prediction model 112 and a global network manager 114. The global network manager 114 manages the global failure prediction model 112 and other alerts from the network devices 106. While the global failure prediction model 112 and the global network manager 114 are depicted in a network controller 110, one or both of the global failure prediction model 112 and the global network manager 114 may be located in other locations.

The global failure prediction model 112, in some embodiments, is the same as the failure prediction models of the network devices 106. In other embodiments, the global failure prediction model 112 is different but has a capability to provide data to update the failure prediction models in the network devices 106. The global failure prediction model 112 receives state parameters and failure data from various optical adapters 104 and, in some embodiments, uses machine learning to refine parameters of the global failure prediction model 112 to be able to send an update to failure prediction models in the network devices 106. Failure data includes when an optical adapter 104 actually failed and may be coupled with state parameters of the optical adapter 104. For example, failure data and state parameters indicative of a particular failure of an optical adapter (e.g. 104*a*) may include a time of the failure, optical adapter information, such as model number, type, etc., temperature conditions, applicable frame checksum error rate, optical transmission power, total optical adapter operational time, etc. at the time of the failure.

For example, the global failure prediction model 112 correlates actual failures of optical adapters 104 with various state parameters so that when a particular network device (e.g. 106*a*) experiences particular conditions, such as voltage spikes, increased temperature, etc., the failure prediction model in the analysis apparatus (e.g. 102*a*) is able to adjust the knee 802, the slope, the shape, etc. of the failure profile 800 to more accurately predict failure of the optical adapter 104*a*. For example, a temperature increase of 30 degrees Fahrenheit may move the knee 802 of the failure profile 800 two years to the left based on actual data of failures of optical adapters 104 in hot environments.

For example, state parameters, failure data, error data, etc. fed to the global failure prediction model 112 may indicate that an increased temperature of an optical adapter 104 moves the knee 802 of the failure profile 800 to the left and may indicate how much the knee 802 moves based on the temperature of the optical adapter 104. Machine learning, in some embodiments, is used to correlate state parameters, individually or in combination, with changes to the failure profile 800 by changing parameters in the global failure prediction model 112, which is then used to update the various failure models of the various analysis apparatuses 102 in network devices 106.

The global network manager 114, in some embodiments, manages the global failure prediction model 112. In some examples, the global network manager 114 manages gathering state parameter data from optical adapters 104 and inputting the state parameters into the global failure prediction model 112. In other embodiments, the global network manager 114 manages sending updates of the failure prediction model to network devices 106. In some embodiments, global network manager 114 sends a current version of the failure prediction model to the analysis apparatus 102 of a new instance of a network device 106 with an optical adapter 104. In other embodiments, the global network manager 114 sends a current version of the failure prediction model to the analysis apparatus 102 of existing network devices 106 with an optical adapter 104. In other embodiments, the global network manager 114 handles alerts received from an analysis apparatus 102 to notify a network administrator, to take corrective action, to steer data traffic away from the network device 106 sending an alert, etc. The global network manager 114 and the global failure prediction model 112 are discussed in more detail below with respect to the apparatus 400 of FIG. 4.

The network devices 106 and the global network manager 114 and global failure prediction model 112, whether in a network controller 110 or elsewhere, communicate over a computer network. The computer network may include a local area network ("LAN"), a wide area network ("WAN"), a cellular network, a fiber optic network, a wireless connection, the Internet, etc. or any combination thereof. The computer network includes cables, routers, servers, and other network equipment known to those of skill in the art.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Figure 2:
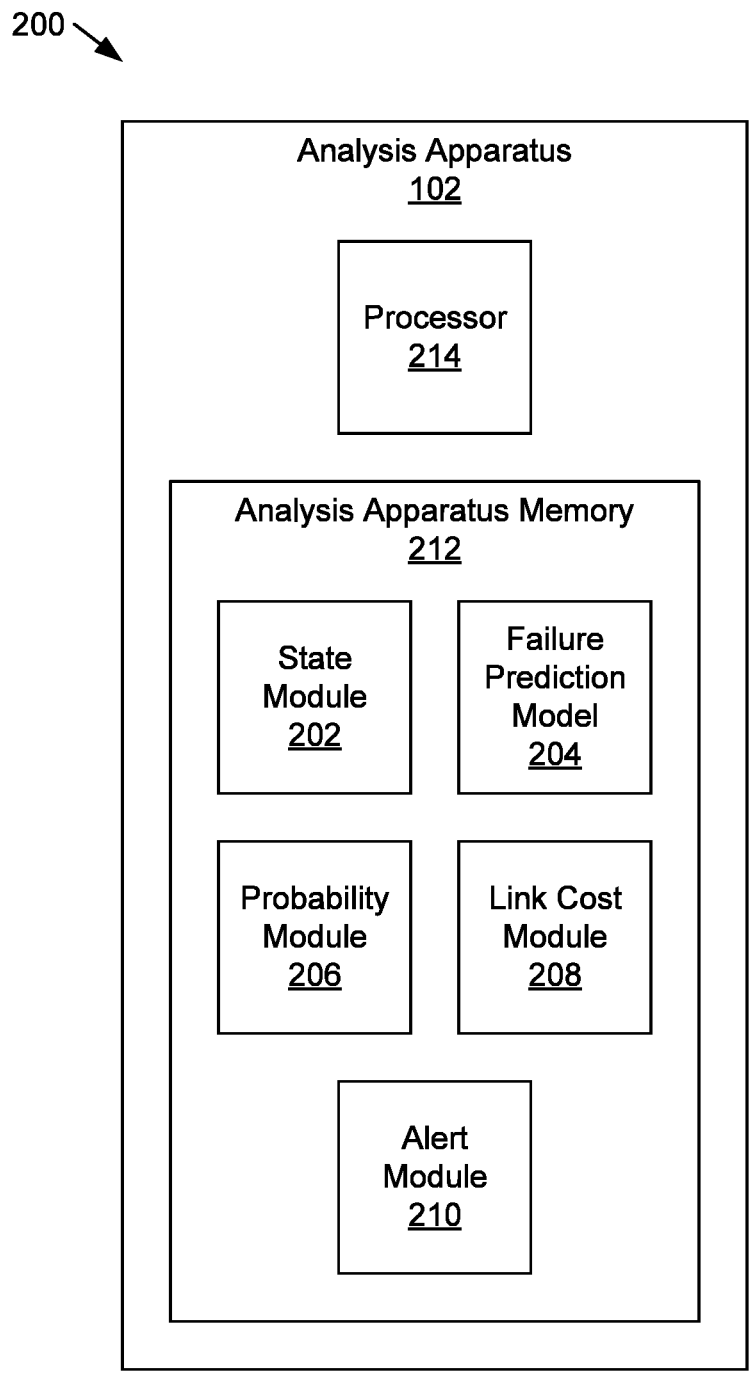
FIG. 2 is a schematic block diagram illustrating one embodiment of an apparatus that includes one embodiment of an analysis apparatus for management of an optical adapter.

FIG. 2 is a schematic block diagram illustrating one embodiment of an apparatus 200 that includes one embodiment of an analysis apparatus 102 for management of an optical adapter 104. The analysis apparatus 102 includes a state module 202, a failure prediction model 204, a probability module 206, a link cost module 208 and alert module 210 in an analysis apparatus memory 212, and a processor 214, which are described in more detail below. While the modules 202-210 are depicted in the analysis apparatus memory 212, in other embodiments, the modules 202-210 may be implemented in other ways, such as a programmable hardware device, an FPGA, an application specific integrated circuit ("ASIC"), hardware circuits, etc.

The apparatus 200 includes a state module 202 that store state parameters from the optical adapter 104 of a network device 106 in a data log. The data log may be a database, a list, a register or other data storage structure capable of storing state parameters. The state parameters are typically available from the optical adapter 104, as described above. In some embodiments, the state module 202 initiates access of the state parameters. In some examples, the state module 202 initiates a request for the state parameters from the optical adapter 104. In other embodiments, the state module 202 receives the state parameters output by the optical adapter 104. In some embodiments, the state module 202 stores state parameters on a periodic basis. In some examples, the state module 202 stores state parameters at a constant rate. In other examples, the state module 202 increases a storage rate of the state parameters when the probability module 206 outputs a failure prediction above a threshold. Other parameters output by the analysis apparatus 212 may also trigger an increase in a storage rate of state parameters.

In some embodiments, the state module 202 stores state parameters in a data log accessible to the failure prediction model 204. In other embodiments, the state module 202 stores state parameters in a data log in the failure prediction model 204. In other embodiments, the state module 202 inputs the state parameters from the data log into the failure prediction model 204. In other embodiments, the failure prediction model accesses the data log with state parameters to input the state parameters into the failure prediction model 204. One of skill in the art will recognize other ways that the state module 202 can store state parameters and how often to store state parameters.

The failure prediction model 204 is a multivariable function that uses state parameters from the optical adapter 104 to generate a probability of failure of the optical adapter 104. In some embodiments, the failure prediction model 204 is implemented in program code. In other embodiments, the failure prediction model 204 is implemented as a function that may be called by program code and/or an application. In other embodiments, the failure prediction model 204 is implemented using multiple equations that work together to produce a probability of failure. In other embodiments, the failure prediction model 204 is implemented in matrix form and executed using linear algebra. One of skill in the art will recognize other ways to implement the failure prediction model 204.

In some embodiments, the apparatus 200 includes a probability module 206 that generates, using the failure prediction model 204, a probability of failure of the optical adapter 104 based on current state parameters from the data log. For example, the probability module 206 may call the failure prediction model 204, input state parameters from the data log and then receives an output of the failure prediction model 204, which is a probability of failure. In some embodiments, the probability module 206 inputs current state parameters into the failure prediction model 204. In other embodiments, the probability module 206 inputs current state parameters along with other most recent state parameters in the failure prediction model 204. One of skill in the art will recognize other ways for the probability module 206 to input state parameters in the failure prediction model 204.

In some embodiments, the probability of failure is a number, percentage or other single indicator of a probability of failure. For example, the probability of failure may be 50 percent, which indicates that the optical adapter 104 has a 50 percent chance of failure at the point in time when the probability module 206 issues the probability of failure.

In other embodiments, the probability of failure includes additional information, such as a portion of a failure profile 800 that includes an increasing probability of failure over time. For example, the probability of failure may include several data points that correlate a probability of failure with a time. For instance, the probability of failure may have a current probability of failure of 20 percent, a probability of failure of 30 percent in two weeks, a probability of failure of 50 percent in 4 weeks, etc. In other embodiments, the probability module 206 outputs an equation of probability of failure as a function of time that is capable of producing a probability of failure of the optical adapter 104 at a particular period of time where the equation is valid for a particular time period, such within the next two weeks. One of skill in the art will recognize other ways for the probability module 206 to input state parameters into the failure prediction model 204 to output a probability of failure based on state parameters.

The apparatus 200 includes link cost module 208 that, in response to the probability of failure reaching a failure threshold, decreases data traffic in the optical link 118. Typically, a system 100 with optical links include one or more redundant paths to an optical link 118. When the probability of failure reaches a failure threshold, indicating that failure of the optical adapter 104 has increased to an unacceptable value and/or failure of the optical adapter 104 is immanent, the link cost module 208 decreases data traffic through the optical adapter 104 of the optical link 118, which increases data traffic through a redundant optical link to minimize impact of failure of the optical adapter 104.

In some embodiments, the link cost module 208 decreases data traffic through the optical link 118 to zero. In other embodiments, the link cost module 208 decreases data traffic so that normal levels of data traffic flow through the redundant optical link while data traffic above a certain level flow through the optical link 118. In some embodiments, the link cost module 208 decreases data traffic by increasing a cost of using the optical link 118. Increasing the cost of using the optical link 118 decreases data traffic to the optical link 118 and increases data traffic to a redundant optical link.

In some embodiments, where network administrators charge for data traffic, the link cost module 208 increases a cost of the optical link 118 in terms of what a client is charged for using the optical link 118. In the embodiments, the network controller 110 or other mechanism seeks to minimize cost of transmitting data so that data traffic will flow through a less costly redundant path. In some embodiments, cost of an optical link is an operational cost. In other embodiments, the cost is used as a mechanism to direct traffic flow and cost is not charged to a client but is used to optimize data traffic. One of skill in the art will recognize other ways to calculate data traffic costs through various optical links and will recognize other ways that the link cost module 208 can increase cost of the optical link 118 in response to the prediction of failure reaching and/or exceeding a failure threshold.

The apparatus 102 includes an alert module 210 that, in response to the probability of failure reaching a failure threshold, sends an alert with the probability of failure. The failure threshold is a probability of failure indicative of impending failure of the optical adapter 104. For example, the failure threshold indicates that the probability of failure has reached an unacceptable risk of failure of the optical adapter 104. In other examples, the failure threshold indicates that an unacceptable amount of failure will occur in the near future so that the alert is issued in enough time before the probability of failure reaching this unacceptable level to allow a network administrator to take corrective action, such as replacing the optical adapter 104 and/or network device 106.

In some embodiments, the alert module 210 sends an alert to the global network manager 114 which sends an alert, recommendations, etc. to a network administrator. In other embodiments, the alert module 210 sends an alert to a network administrator. In some embodiments, the alert module 210 includes in the alert the prediction of failure. In other embodiments, the alert module 210 sends a time for corrective action. For example, the alert module 210 may send an alert that includes a time when data traffic is predicted to be low for the corrective action. In other embodiments, the alert module 210 sends an alert that includes one or more recommended corrective actions. In other embodiments, the alert module 210 triggers another device, module, alert service, etc. to send the alert. One of skill in the art will recognize other ways that the alert module 210 can send an alert and contents of the alert.

Figure 3:
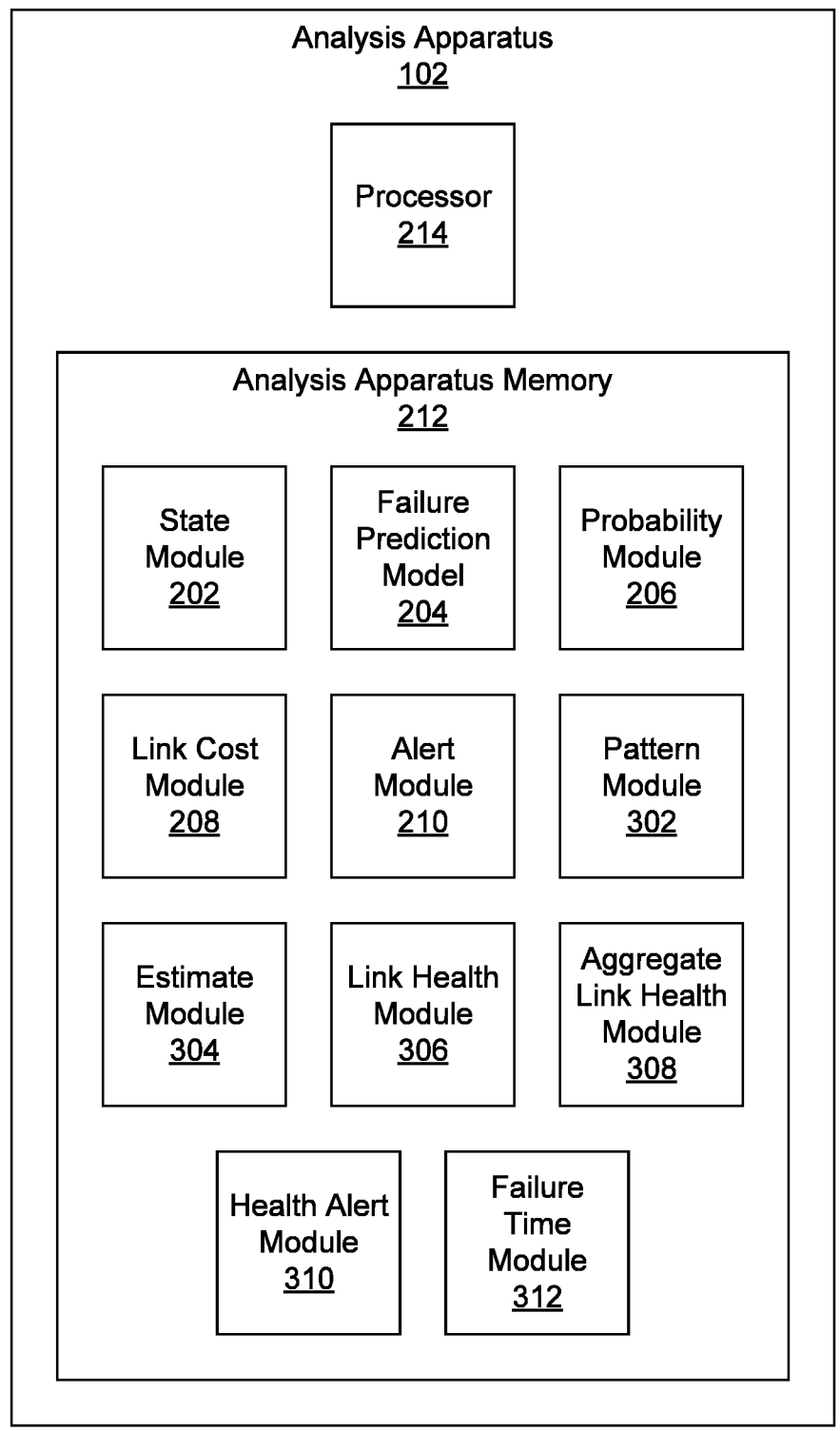
FIG. 3 is a schematic block diagram illustrating another embodiment of an apparatus that includes another embodiment of an analysis apparatus for management of an optical adapter.

FIG. 3 is a schematic block diagram illustrating another embodiment of an apparatus 300 that includes another embodiment of an analysis apparatus 102 for management of an optical adapter 104. The analysis apparatus 102 includes a state module 202, a failure prediction model 204, a probability module 206, a link cost module 208 and alert module 210 in an analysis apparatus memory 212, and a processor 214, which are substantially similar to those described above in relation to the apparatus 200 of FIG. 2. The apparatus 300, in various embodiments, includes a pattern module 302, an estimate module 304, a link health module 306, an aggregated link health module 308, a health alert module 310 and/or a failure time module 312, which are described in more detail below. The apparatus 300 of FIG. 3 may be embodied by program code, a programmable hardware device, and/or hardware circuits similar to the apparatus 200 of FIG. 2.

The apparatus 300, in some embodiments includes a pattern module 302 that monitors data traffic patterns for the optical link 118 and an estimate module 304 that estimates, based on the data traffic patterns, a time for corrective action for the optical adapter 104 of the optical link 118. The time for corrective action includes a time prior to a predicted failure based on the probability of failure and the alert send by the alert module 210 includes the time for the corrective action. In some embodiments, the estimated time for the corrective action is a time with a low amount of disruptiveness to data traffic on the optical link 118. In other embodiments, the pattern module 302 monitoring data traffic patterns for the optical link 118 includes determining a pattern with a time period of when data traffic to the optical link 118 is low.

For example, the estimate module 304 may determine that data traffic is low at a particular time of day, such as between 11 PM and 2 AM. In other examples, the estimate module 304 may determine that data traffic is low at a particular day of the week, such as on Sunday. In another example, the estimate module 304 may determine that data traffic is low at a particular time of day of a particular day of the week, such as between Saturday at 11 PM and Sunday at 2 AM. Once the estimate module 304 has identified various patterns with times where data traffic is low, the estimate module 304 selects a time based on the prediction of failure for corrective action and the alert module 210 includes the time for corrective action that is when data traffic is predicted to be low and before a time when the predicted of failure is to reach an unacceptable level. For example, if the probability of failure output by the probability module 206 indicates that the optical adapter 104 will reach an unacceptable probability of failure in one week, the estimate module 304 selects a time for corrective action within the next week at a time when data traffic is low so that disruption caused by the corrective action is low.

The apparatus 300, in some embodiments, includes a link health module 306 that determines a current link health that is a function of the probability of failure of the optical adapter and a frame checksum error rate. For example, the link health may be of the form:

$$LH = (E_r, P_f) \qquad (1)$$

Where:

$E_r$ is the current error rate of the optical link 118, which is ideally 0%, and $P_f$ is the probability of failure of the optical adapter 104, which is ideally 0%.

The current error rate $E_r$ is a checksum error rate of data received by an optical adapter 104 of the optical link 118. For example, where the failure prediction model 204 of the analysis apparatus A 102a monitors optical adapter A 104a, the error rate may be determined at the receiving optical adapter B 104b. As the transmitter of optical adapter A 104a starts to fail, transmission of data may be affected by the optical transceiver of optical adapter A 104A, for example when transmission power of the transmitter in optical adapter A 104a starts to degrade. This degradation of optical adapter A 104a may cause checksum errors in the receiving optical adapter B 104b, which is monitored to determine link health LH of the optical link 118. In other embodiments, the current error rate $E_r$ may indicate immanent failure of the receiver of the optical adapter A 104a. For example, the transmitter of optical adapter B 104b may be sending a strong, correct signal and the receiver of optical adapter A 104a may be failing, which causes the frame checksum error rate $E_r$ to be high.

A function that includes both the current error rate $E_r$ and the probability of failure $P_f$ is used to determine link health LH which degrades with an increase in probability of failure $P_f$, the current error rate $E_r$, or both. For example, where the current error rate $E_r$ and the probability of failure $P_f$ are both low, the link health LH is high and as either the current error rate $E_r$ and/or the probability of failure $P_f$ increase, the link health LH decrease. In some embodiments, the link health module 306 sends link health LH to the alert module 210 be sent in an alert. In other embodiments, the link health module 306 outputs an alert.

In some embodiments, the network devices 106a, 106b of an optical link 118 communicate so that the analysis module 102a producing the probability of failure $P_f$ has the current error rate $E_r$ to produce the link health LH. In other embodiments, the link health module 306 is in the global network manager 114 and the network devices 106a, 106b of an optical link 118 communicate with the link health module 306 of the global network manager 114 to produce the link health LH.

In some embodiments, the apparatus 300 includes a aggregated link health module 308 that determines a current aggregated link health LHA that is a function of the current error rate $E_r$ and a frame checksum error threshold $L_{th}$. In some embodiments, the aggregated link health LHA is a percentage where a current error rate $E_r$ of zero produces a aggregated link health LHA of 100% and where an error rate $E_r$ matching or exceeding the frame checksum error threshold $L_{th}$ has a aggregated link health LHA of 0%. In some embodiments, the aggregated link health LHA is calculated with the equation:

$$LHA = \max\left\{0, 100 - \left(\frac{E_r}{L_{th}} \cdot 100\right)\right\} \quad (2)$$

In some embodiments, the current aggregated link health LHA is 0% if the probability of failure $P_f$ is 100%, otherwise the current aggregated link health LHA is calculated according to equation 2.

The frame checksum error threshold $L_{th}$ is set, in some embodiments, to a level indicative of an unacceptable frame checksum error for an optical adapter 104. The frame checksum error threshold $L_{th}$, in some embodiments, is set by a system administrator based on network traffic and other relevant local conditions. In another embodiment, the frame checksum error threshold $L_{th}$ is set to a default value. The aggregated link health LHA, in some embodiments, is used by the global failure prediction model 112 along with failure data of the optical adapters 104 to further refine the global failure prediction model 112 so that a current error rate $E_r$ can be used to determine the probability of failure $P_f$. In other embodiments, the aggregated link health LHA is used to generate alerts.

In some embodiments, the failure prediction model 204 is configured to determine a predicted aggregated link failure time, which is a predicted time when the aggregated link health LHA reaches zero. For example, the global failure prediction model 112 may include an error rate $E_r$ prediction function and may use state parameters, failure data, etc. to refine the failure prediction models 204 sent to network devices 106 to provide a current model for error rate $E_r$ prediction. A local network device (e.g. 106a) with an analysis module 102a with this error rate $E_r$ prediction function may then communicate with another network device (e.g. 106b) that is part of the same optical link 118 to gather error rate data from frame checksum errors of the receiving optical adapter 104b for the aggregated link health module 308 to then use the error rate data to determine degradation of a transmission function of the optical adapter 104a. In addition, the aggregated link health module 308 may use error rate data of a receiver of the optical adapter 104a to determine degradation of the receiver of the optical adapter 104a.

In other embodiments, the aggregated link health module 308 uses the error rate $E_r$ prediction function of the failure prediction model 204 to determine a link alert time which is a predicted time when the aggregated link health LHA reaches an aggregated link health LHA threshold. The LHA threshold, for example, may be set to 50% or other relevant threshold useful to trigger an alert prior to failure of the optical adapter 104.

In some embodiments, the apparatus 300 includes a health alert module 310 that determines a predicted link health alert time $T_{LHF}$ which is a predicted time of the probability of failure $P_f$ of the link health LH component of the optical adapter 104 reaching a probability of failure threshold independent of the frame checksum error rate $E_r$. In some embodiments, the probability of failure threshold is the same as the failure threshold used by the alert module 210. In other embodiments, the probability of failure threshold is 50%. The probability of failure threshold, in some embodiments, is set to a value that is sufficiently before failure of the optical adapter 104, as predicted by the probability of failure $P_f$ to allow time for corrective action.

In some embodiments, the apparatus 300 includes a failure time module 312 that determines a predicted link efficiency failure time $T_{LEF}(L_{TH})$ which is a time when a frame checksum error rate $E_r$ of the optical adapter 104 is predicted to reach a frame checksum error threshold $L_{th}$, which is independent of the probability of failure $P_f$. Where the failure prediction model 204 has the ability to predict the frame checksum error rate $E_r$, the failure time module 312 estimates a particular link efficiency failure time $T_{LEF}(L_{TH})$ in the future where the frame checksum error rate $E_r$ reaches the frame checksum error threshold $L_{th}$, which is useful to predict ahead of a failure, as manifest by the error rate $E_r$, when the optical adapter 104 has reached a level of frame checksum errors that is unacceptable.

The embodiments of the analysis apparatus 102 in FIGS. 2 and 3 produce predictions of when the optical adapter 104 will fail or reaches a point where the likelihood of failure is unacceptable and generates various alerts so that a corrective action can be scheduled to minimize disruption of data transmission in the system 100. The embodiments of the analysis apparatus 102 produce various predictions using probability of failure $P_f$, the frame checksum error rate $E_r$, the link health alert time $T_{LHF}$, the link efficiency failure time $T_{LEF}(L_{TH})$, the link health LH, the aggregated link health LHA, etc. to provide failure predictions from various perspectives to minimize the chances of the optical adapter 104 failing before corrective action is taken. In addition, the apparatus 300 identifies, from patterns in data traffic, times when corrective action minimize disruption of data traffic to better schedule corrective action. The embodiments of the analysis apparatus 102 also reduce data traffic through a failing optical link 118 to minimize disruption of data traffic in the event that the optical adapter 104 fails early.

Figure 4:
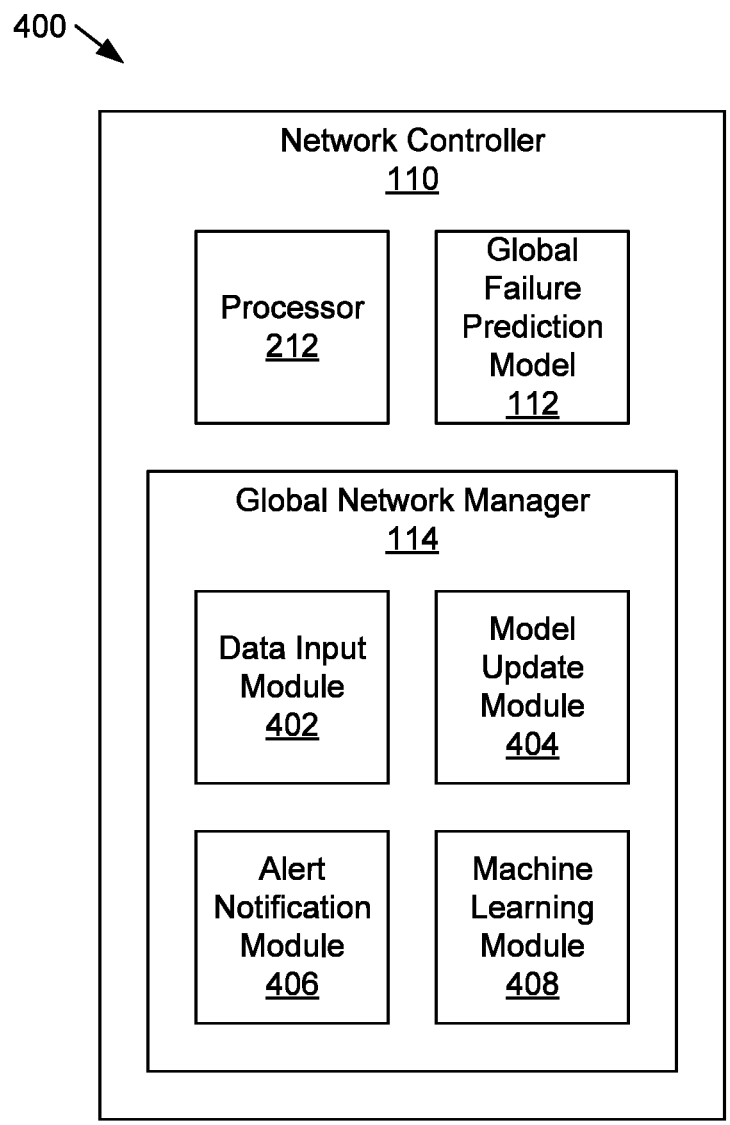
FIG. 4 is a schematic block diagram illustrating one embodiment of an apparatus that includes a network controller with a global network manager for managing optical adapters.

FIG. 4 is a schematic block diagram illustrating one embodiment of an apparatus 400 that includes a network controller 110 with a global network manager 114 for managing optical adapters 104. The network controller 110 includes a global failure prediction model 112, a processor 214 and the global network manager 114 with a data input module 402, a model update module 404, an alert notification module 406, and a machine learning module 408, which are described below. The apparatus 400 may be implemented in a network controller 110 as shown or may be implemented elsewhere in a location connected to the network devices 106. In some embodiments, the global failure prediction model 112 and/or the global network manager 114 are implemented using program code executable on a processor, such as the processor 214 of the network controller 110. In some embodiments, the global failure prediction model 112 and/or the global network manager 114 are implemented using an FPGA, a programmable logic array or other programmable hardware device. In some embodiments, a portion or all of the global failure prediction model 112 and/or the global network manager 114 are implemented using hardware circuits.

The apparatus 400 includes a data input module 402 that receives state parameters, failure data, and the like from various optical adapters 104. In some embodiments, the optical adapters 104 are within a particular network. In other embodiments, the optical adapters 104 are within two or more networks. For example, the data input module 402 may receive state parameters from numerous systems of various clients of a manufacturer. The input module 402, in some embodiments, stores the state parameters, failure data, etc. in a data log. The data log may be a database, an ordered list, or any other data structure convenient for the global failure prediction model 112 to read and access the data. The data input module 402 gathers data from optical adapters 104 so that the global failure prediction model 112 can refine probability of failure predictions and error rate predictions.

The apparatus 400 includes a model update module 404 that refines, using machine learning from the machine learning module 410, the failure prediction model 204 based on the failure data and related state parameters of various optical adapters 104. In other embodiments, the model update module 404 periodically sends out an update of the failure prediction model 204 to various network devices 106 that include an optical adapter 104. In some examples, the model update module 404 periodically supplies an update of the failure prediction model 204 to network devices 106 that include a same or similar optical adapters 104 for which the failure prediction model 204 is created. In some examples, various types, models, brands, etc. of optical adapters 104 have different failure prediction models 204. In other embodiments, the failure prediction model 204 covers several optical adapter versions, models, types, etc. In some embodiments, a failure prediction model 204 can be customized for a particular optical adapter 104 using input parameters specific for a particular installation. In some embodiments, the global failure prediction model 112 is for a particular type, version, model, etc. of an optical adapter 104. In other embodiments, the global failure prediction model 112 produces reliable predictions for various optical adapters 104.

As data from the data log is applied to the global failure prediction model 112, the global failure prediction model 112 is refined using the machine learning module 410 so that the model update module 404 is able to periodically send out updates to the failure prediction model 204 that are more accurate based on various correlations between state parameters and failure data. In some embodiments, the model update module 404 sends out a latest version of the failure prediction model 204 for new installations of an optical adapter 104 and/or network device 106. In some embodiments, the global failure prediction model 112 is the same as the failure prediction models 204 of the various network devices 106. In other embodiments, the global failure prediction model 112 differs from the failure prediction models 204 of the network devices 106. In some examples, the failure prediction models 204 of the network devices 106 are simplified versions of the global failure prediction model 112 but has same mathematical equations, formulas, algorithms, etc. so that the global failure prediction model 112 reacts similarly to the failure prediction models 204 of the network devices 106 and can produce a failure prediction model 204 to be sent to analysis apparatuses 102 of network devices 106.

The apparatus 400 includes an alert notification module 406 that receives alerts from various alert modules 210 of network devices, determines an appropriate alert and/or sends an alert to a system administrator, program, etc. to react to the alert. In some embodiments, the alert notification module 406 includes a time for corrective action that minimizes disruption of network traffic. In other embodiments, the alert notification module 406 sends one or more corrective actions to be taken for the failing optical adapter 104. In some embodiments, a corrective action includes replacing the optical adapter 104. In other embodiments, a corrective action includes repair of an optical adapter 104 and/or replacement of failing parts of the optical adapter 104. In other embodiments, the apparatus 400 merely forwards alerts to a system administrator or other computing device. One of skill in the art will recognize other ways for the alert notification module 406 to send an appropriate alert to a system administrator or other party or device prior to failure of the optical adapter 104 for which the alert pertains.

The apparatus 400 includes a machine learning module 408 that uses machine learning to correlate various state parameters to failure data of various optical adapters 104 to refine a failure prediction model 204. The failure prediction model 204, in some embodiments, is the global failure prediction model 112 and the machine learning module 408 applies state parameters and failure data of optical adapters 104 to the global failure prediction model 112 to refine the global failure prediction model 112. In other embodiments, a machine learning module 408 in a network device 106 refines a local failure prediction model 204 to improve accuracy of probability of failure of the failure prediction model 204. In various embodiments, the machine learning module 408 is substantially similar to machine learning, machine learning modules, etc. described above. One of skill in the art will recognize various machine learning techniques for correlating state parameters with failure data to improve a failure prediction model 204.

Figure 5:
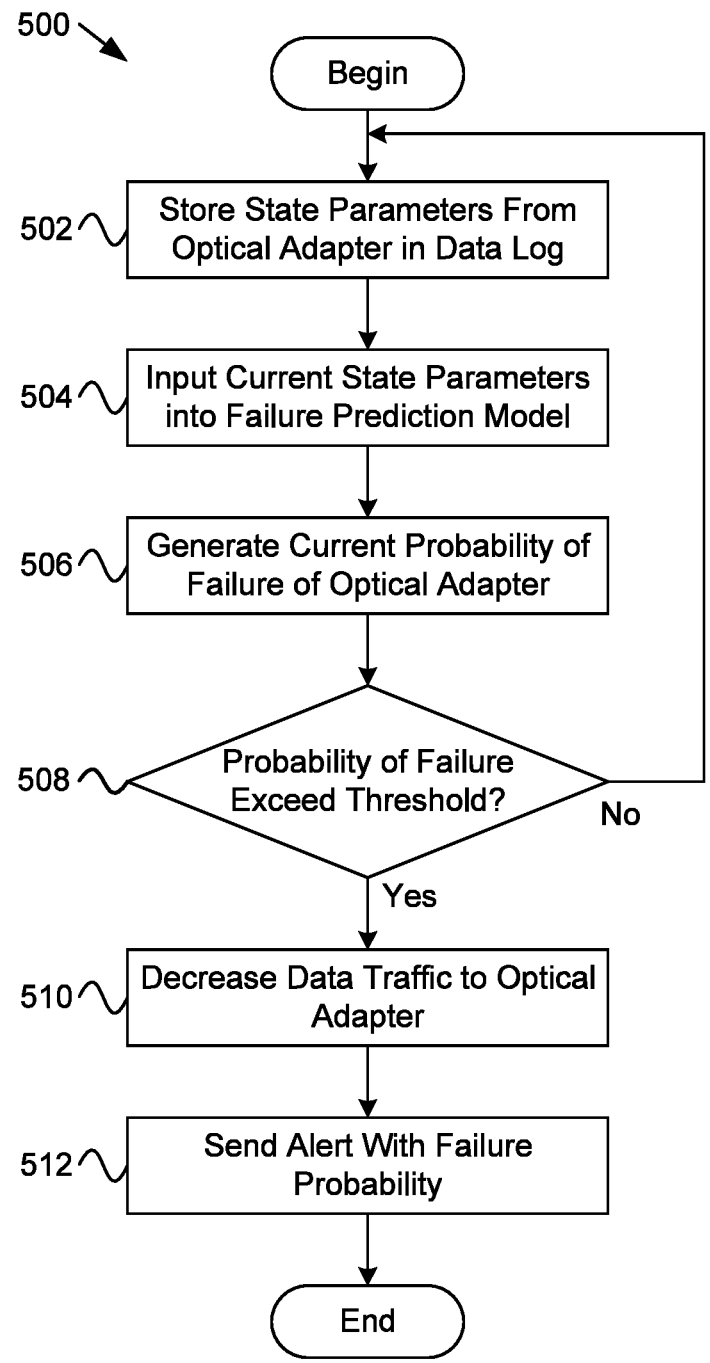
FIG. 5 is a schematic flow chart diagram illustrating one embodiment of a method for managing an optical adapter.

FIG. 5 is a schematic flow chart diagram illustrating one embodiment of a method 500 for managing an optical adapter 104. The method 500 begins and stores 502 state parameters from an optical adapter 104 of an optical link 118 in a data log. The optical adapter 104 is in a network device 106. The method 500 inputs 504 the state parameters from the data log into a failure prediction model 204. The method 500 generates 506, using the failure prediction model 204, a probability of failure of the optical adapter 104 based on current state parameters from the data log.

The method 500 determines 508 if the probability of failure exceeds a failure threshold. If the method 500 determines 508 that the probability of failure does not exceed the failure threshold, the method 500 returns and stores 502 state parameters from the optical adapter 104. If the method 500 determines 508 that the probability of failure meets and/or exceeds the failure threshold, the method 500 decreases 510 data traffic in the optical link 118 and sends 512 an alert that includes the probability of failure. The failure threshold includes a probability of failure indicative of impending failure of the optical adapter 104. In some embodiments, the method 500 is implemented using the state module 202, the failure prediction model 204, the probability module 206, the link cost module 208 and/or the alert module 210.

Figure 6A:
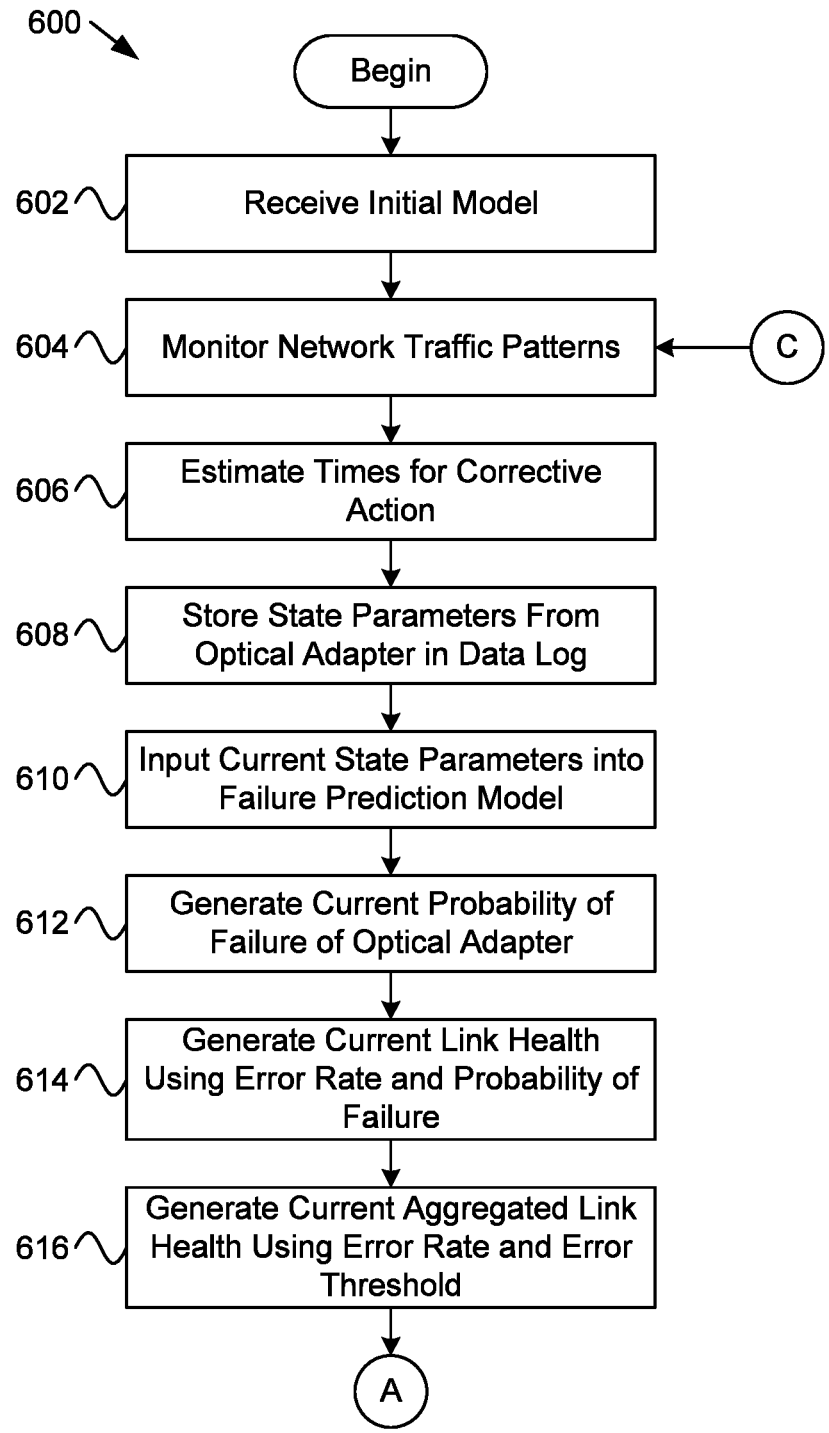
FIG. 6A is a first part of a schematic flow chart diagram illustrating another embodiment of a method for managing an optical adapter.
Figure 6B:
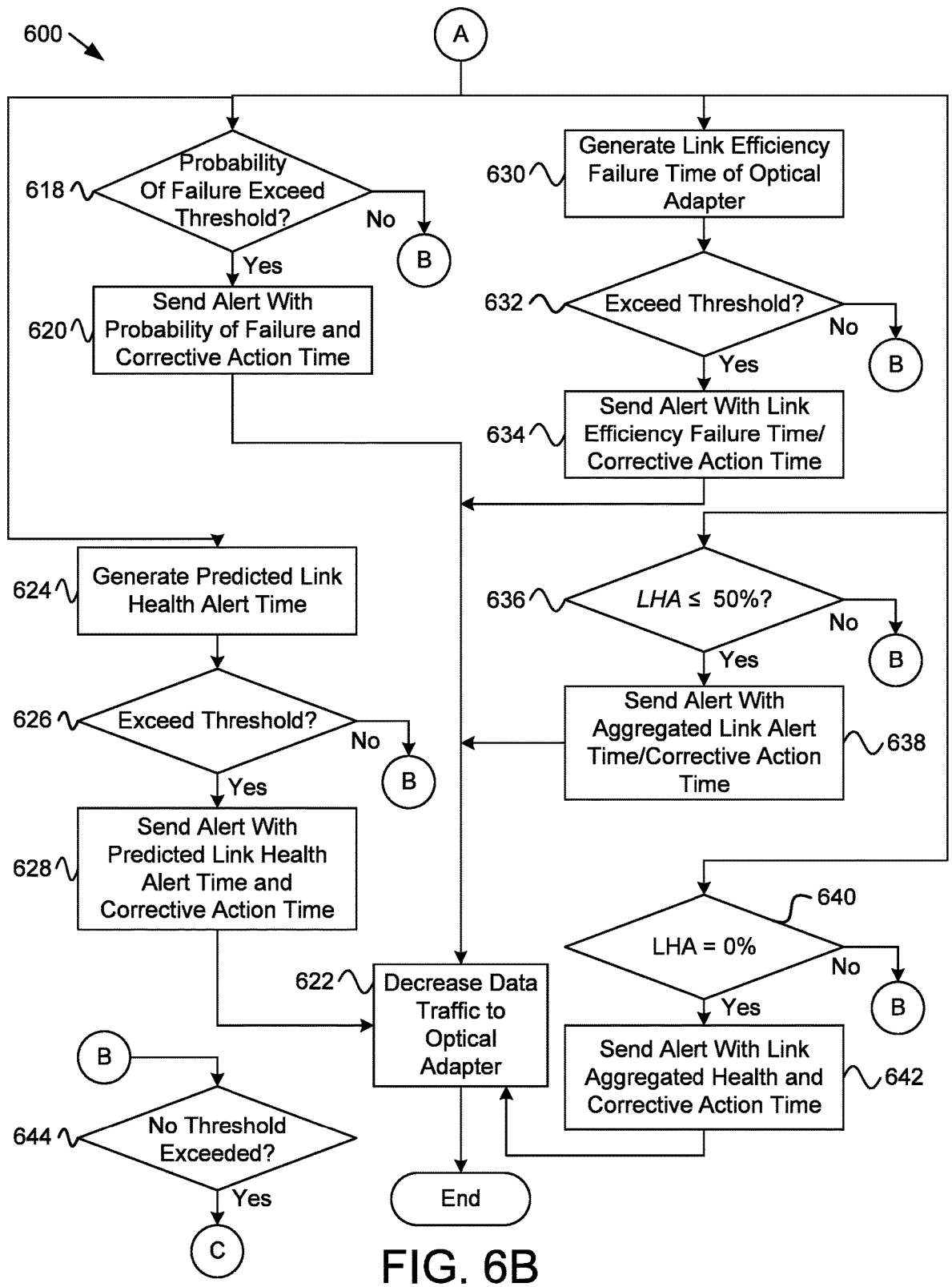
FIG. 6B is a second part of the schematic flow chart diagram illustrating another embodiment of a method for managing an optical adapter.

FIG. 6A is a first part and FIG. 6B is a second part of a schematic flow chart diagram illustrating another embodiment of a method 600 for managing an optical adapter 104. The method 600 begins and receives 602 an initial failure prediction model 204 at an analysis apparatus (e.g. 102a) of a network device (e.g. 106a) with an optical adapter (e.g. 104a). (The method 600 is discussed below as applicable to the optical adapter 104a of the network device 106a, but the method 600 is applicable to other optical adapters 104.) The optical adapter 104a is part of an optical link 118. The initial failure prediction model 204, in some embodiments, is received from the network controller 110, the global network manager 114 and/or the global failure prediction model 112 and, in some embodiments, is a most current version of the failure prediction model 204.

The method 600 monitors 604 network traffic patterns of the optical link 118 and estimates 606, based on the data traffic patterns, a time for corrective action for the optical adapter 104a of the optical link 118. The time for corrective action is a time prior to a predicted failure based on a probability of failure of the optical adapter 104a discussed below. The method 600 stores 608 state parameters from the optical adapter 104a in a data log and inputs 610 the state parameters from the data log into the failure prediction model 204. The method 600 generates 612, using the failure prediction model 204, a probability of failure of the optical adapter 104a, generates 614 a current link health LH of the optical adapter 104a based on current state parameters from the data log. The link health LH is a function of both the probability of failure $P_f$ of the optical adapter 104a and a frame checksum error rate $E_r$ applicable to the optical adapter 104a. The method 600 generates 616 an aggregated link health LHA using the frame checksum error rate $E_r$, as described above with respect to the apparatus 300 of FIG. 3.

The method 600 determines 618 if the predicted probability of failure exceeds a failure threshold (follow A on FIG. 6A to A on FIG. 6B). If the method 600 determines 618 that the probability of failure for the optical adapter 104a has exceeded the failure threshold, the method 600 sends 620 an alert with the probability of failure and the determined time for a corrective action and the method 600 decreases data traffic through the optical adapter 118, and the method 600 ends. If the method 600 determines 618 that the probability of failure for the optical adapter 104a has not exceeded the failure threshold, the method 600 determines 644 if no threshold has been exceeded.

The method 600 also generates 624 a predicted link health alert time $T_{LHF}$ for the optical adapter 104a, which is the predicted time of the probability of failure $P_f$ of the optical adapter 104a reaching a probability of failure threshold independent of a frame checksum error rate $E_r$. The method 600 determines 626 if the predicted link health alert time $T_{LHF}$ has exceeded the probability of failure threshold. If the method 600 determines 626 that the predicted link health alert time $T_{LHF}$ has exceeded the probability of failure threshold, the method 600 sends 628 an alert with the predicted link health alert time $T_{LHF}$ and a corrective action time, the method 600 decreases network traffic through the optical adapter 118, and the method 600 ends. If the method 600 determines 626 that the predicted link health alert time $T_{LHF}$ has not exceeded the probability of failure threshold, the method 600 determines 644 if no threshold has been exceeded.

The method 600 generates 630 a predicted link efficiency failure time $T_{LEF}(L_{TH})$ which is a time when a frame checksum error rate $E_r$ of the optical adapter 104a is predicted to reach a frame checksum error threshold independent of the probability of failure $P_f$. The method 600 determines 632 if the predicted link efficiency failure time $T_{LEF}(L_{TH})$ exceeds the frame checksum error threshold. If the method 600 determines 632 that the predicted link efficiency failure time $T_{LEF}(L_{TH})$ exceeds the frame checksum error threshold, the method 600 sends 634 an alert with the predicted link efficiency failure time $T_{LEF}(L_{TH})$ and a corrective action time, and the method 600 ends. If the method 600 determines 632 if the predicted link efficiency failure time $T_{LEF}(L_{TH})$ has not exceed the frame checksum error threshold, the method 600 determines 644 if no threshold has been exceeded.

The method 600 determines 636 if the aggregated link health LHA has reduced to 50% or less. If the method 600 determines 636 that the aggregated link health LHA has reduced to 50% or less, the method 600 sends 638 an alert with the aggregated link health LHA, which is a predicted aggregated link alert time, and a corrective action time. The method 600 decreases 622 network traffic through the optical adapter 118, and the method 600 ends. If the method 600 determines 636 that the aggregated link health LHA is still above 50%, the method 600 determines 644 if no threshold has been exceeded.

The method 600 determines 640 if the aggregated link health LHA has reached zero. If the method 600 determines 640 that the aggregated link health LHA has reached zero, the method 600 sends 642 an alert with the aggregated link health LHA and a corrective action time, decreases 622 network traffic through the optical adapter 118, and the method 600 ends. If the method 600 determines 638 that the aggregated link health LHA has not reached zero, the method 600 determines 644 if no threshold has been exceeded.

If the method 600 determines 644 that none of the thresholds has been exceeded in steps 618, 626, 632, 636, and 640, the method 600 returns and monitors 604 network traffic (follow C on FIG. 6B to C on FIG. 6A). Otherwise, one of the steps 618, 626, 632, 636, and 640 resulted in an alert being sent. In some embodiments, the method 600 is implemented using the state module 202, the failure prediction model 204, the probability module 206, the link cost module 208, the alert module 210, the pattern module 302, the estimate module 304, the link health module 306, the aggregated link health module 308, the health alert module 310 and/or the failure time module 312.

Figure 7:
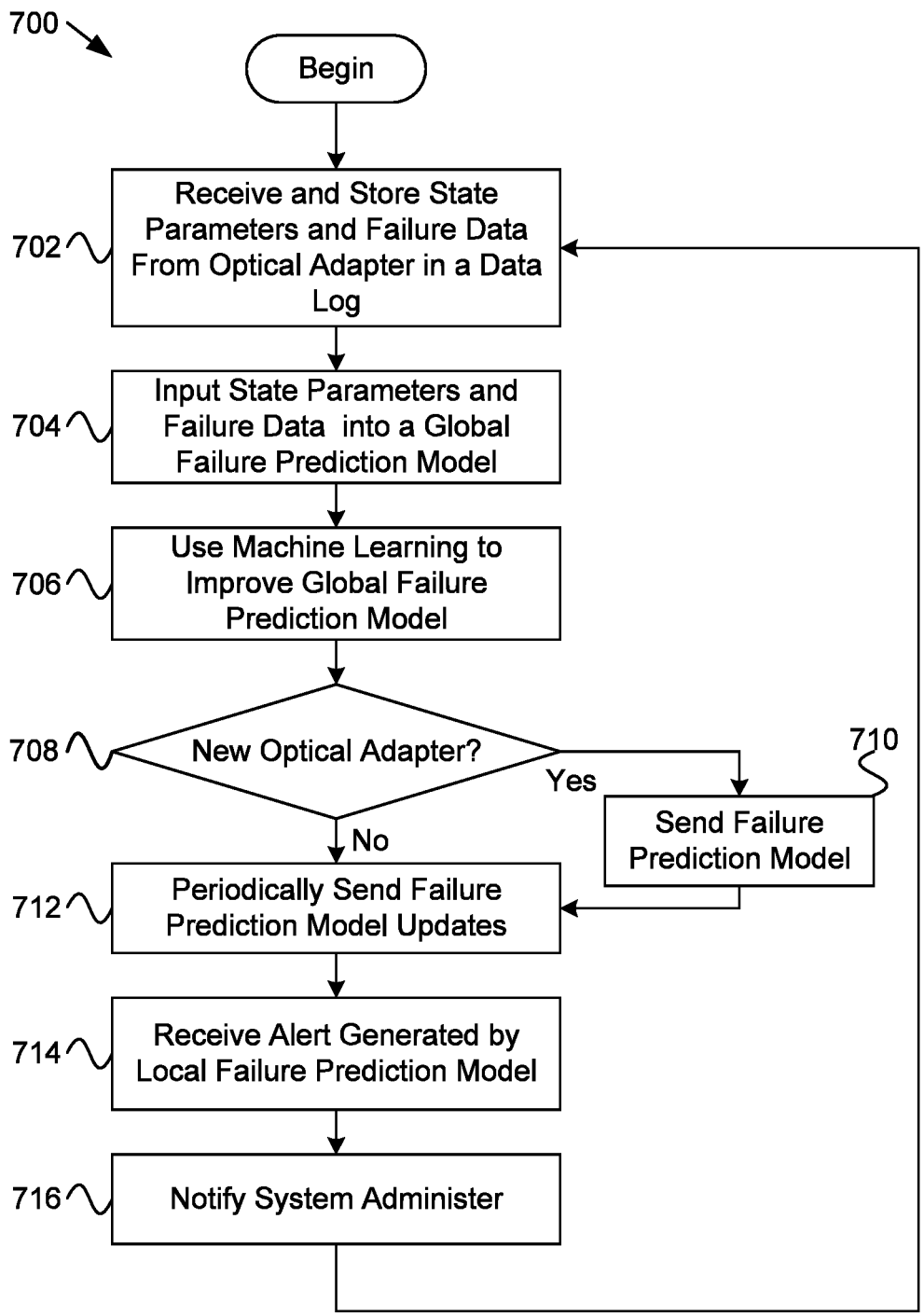
FIG. 7 is a schematic flow chart diagram illustrating one embodiment of a method for updating a failure prediction model for optical adapters.

FIG. 7 is a schematic flow chart diagram illustrating one embodiment of a method 700 for updating a failure prediction model 204 for optical adapters 104. The method 700 begins and receives 702 and stores state parameters and failure data from various optical adapters 104 in a data log. The method 700 inputs 704 the state parameters and the failure data from the data log into a global failure prediction model 112 and uses 706 machine learning to improve the global failure prediction model 112.

The method 700 determines 708 if a new network device 106 with an optical adapter 104 is being installed, for example, by receiving a request to update a failure prediction model 204. If the method 700 determines 708 that there is a new network device 106 with an optical adapter 104, the method sends 710 a current version of a failure prediction model 204 from the global failure prediction model 112. The method 700 periodically sends 712 an update to the failure prediction model 204 from the global failure prediction model 112 to network devices 106 with an optical adapter 104.

In some embodiments, the method 700 at some point receives 714 from an analysis apparatus 102 an alert generated by a local failure prediction model 204 and notifies 716 a system administrator or takes other corrective action. The method 700 returns and continuously receives 702 and stores state parameters and failure data from various optical adapters 104. In some embodiments, the method 700 is implemented using the data input module 402, the model update module 404, the alert notification module 406 and/or the machine learning module 408.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor in a network device comprising an optical adapter of an optical link; and
    a memory that stores program code executable by the processor to:
        store state parameters from the optical adapter in a data log;
        input the state parameters from the data log into a failure prediction model;
        generate, using the failure prediction model, a probability of failure of the optical adapter based on current state parameters from the data log;
        monitor data traffic patterns for the optical link;
        estimate, based on the data traffic patterns, a time for corrective action for the optical adapter of the optical link, the time for corrective action comprising a time prior to a predicted failure based on the probability of failure, the estimated time for the corrective action comprising a time with a low amount of disruptiveness to data traffic; and
        in response to the probability of failure reaching a failure threshold:
            decrease data traffic in the optical link; and
            send an alert comprising the probability of failure, wherein the failure threshold comprises a probability of failure indicative of impending failure of the optical adapter, and wherein the alert comprises the time for the corrective action.

2. The apparatus of claim 1, wherein the program code to monitor data traffic patterns for the optical link comprises determining a pattern comprising a time period of when data traffic to the optical link is low.

3. The apparatus of claim 1, wherein decreasing data traffic in the optical link comprises increasing a cost of using the optical link, wherein increasing the cost of using the optical link decreases data traffic to the optical link and increases data traffic to a redundant optical link.

4. The apparatus of claim 1, wherein the program code is further executable by the processor to:
    gather failure data of a plurality of optical adapters and related state parameters of the plurality of optical adapters; and
    refine, using machine learning, the failure prediction model based on the failure data of the plurality of optical adapters and related state parameters of the plurality of optical adapters.

5. The apparatus of claim 4, wherein the network device comprises the failure prediction model and a global network manager comprises an additional failure prediction model, wherein the gathered failure data of the plurality of optical adapters and related state parameters of the plurality of optical adapters is gathered at the global network manager which refines the failure prediction model at the global network manager, and wherein the program code is further executable by the processor to receive model parameters from the global network manager and to modify the failure prediction model at the network device based on the refinements to the failure prediction model at the global network manager.

6. The apparatus of claim 1, wherein the program code is further executable by the processor to determine a current link health, wherein the current link health is a function of the probability of failure of the optical adapter and a frame checksum error rate.

7. The apparatus of claim 1, wherein the program code is further executable by the processor to determine a current aggregated link health ("LHA"):

$$LHA = \max\left(0, 100 - \left(\frac{E_r}{L_{th}} \cdot 100\right)\right)$$

wherein:
    $E_r$ is a frame checksum error rate, and
    $L_{th}$ is a frame checksum error threshold.

8. The apparatus of claim 7, wherein the program code is further executable by the processor to determine a predicted aggregated link failure time comprising a predicted time when the LHA reaches zero.

9. The apparatus of claim 7, wherein the program code is further executable by the processor to determine a link alert time comprising a predicted time when the LHA reaches an LHA threshold.

10. The apparatus of claim 1, wherein the program code is further executable by the processor to determine a predicted link health alert time $T_{LHF}$ comprising a predicted time of the probability of failure of the optical adapter reaching a probability of failure threshold independent of a frame checksum error rate.

11. The apparatus of claim 1, wherein the program code is further executable by the processor to determine a predicted link efficiency failure time $T_{LEF}(L_{TH})$ comprising a time when a frame checksum error rate of the optical adapter is predicted to reach a frame checksum error threshold independent of the probability of failure.

12. A method comprising:
    monitoring, by use of a processor, data traffic patterns for an optical link comprising an optical adapter;
    storing, by use of the processor, state parameters from the optical adapter in a data log;
    inputting, by use of the processor, the state parameters from the data log into a failure prediction model;
    generating, by use of the processor and using the failure prediction model, a probability of failure of the optical adapter based on current state parameters from the data log;
    estimating, by use of the processor and based on the data traffic patterns, a time for corrective action for the optical adapter, the time for corrective action comprising a time prior to a predicted failure based on the probability of failure; and
    sending, by use of the processor, an alert comprising the probability of failure in response to the probability of failure reaching a failure threshold, the failure threshold comprising a probability of failure indicative of impending failure of the optical adapter, wherein the alert comprises an estimated time for the corrective action, the estimated time for the corrective action comprises a time with a low amount of disruptiveness to data traffic.

13. The method of claim 12, further comprising, in response to the probability of failure reaching the failure threshold, decreasing data traffic in the optical link.

14. The method of claim 13, wherein decreasing data traffic in the optical link comprises increasing a cost of using the optical link, wherein increasing the cost of using the optical link decreases data traffic to the optical link and increases data traffic to a redundant optical link.

15. The method of claim 12, further comprising:
gathering failure data of a plurality of optical adapters and related state parameters of the plurality of optical adapters; and
refining, using machine learning, the failure prediction model based on the failure data of the plurality of optical adapters and related state parameters of the plurality of optical adapters,
wherein the failure prediction model is in a network device and a global network manager comprises an additional failure prediction model, wherein the gathered failure data of the plurality of optical adapters and related state parameters of the plurality of optical adapters are gathered at the global network manager which refines the failure prediction model at the global network manager, and further comprising receiving model parameters from the global network manager and modifying the failure prediction model at the network device based on the refinements to the failure prediction model at the global network manager.

16. The method of claim 12, wherein monitoring data traffic patterns for the optical link comprises determining a pattern comprising a time period of when data traffic to the optical link is low.

17. The method of claim 12, further comprising determining a current aggregated link health ("LHA"):

$$LHA = \max\left(0, 100 - \left(\frac{E_r}{L_{th}} \cdot 100\right)\right)$$

wherein:
$E_r$ is a frame checksum error rate, and
$L_{th}$ is a frame checksum error threshold, and
further comprising determining a predicted aggregated link failure time comprising a predicted time when the LHA reaches zero.

18. A program product comprising a non-transitory computer readable storage medium with program code, the program code being configured to be executable by a processor to perform operations comprising:
storing state parameters from an optical adapter of an optical link in a data log;
inputting the state parameters from the data log into a failure prediction model;
generating, using the failure prediction model, a probability of failure of the optical adapter based on current state parameters from the data log;
monitoring data traffic patterns for the optical link;
estimating, based on the data traffic patterns, a time for corrective action for the optical adapter of the optical link, the time for corrective action comprising a time prior to a predicted failure based on the probability of failure, the estimated time for the corrective action comprising a time with a low amount of disruptiveness to data traffic; and
in response to the probability of failure reaching a failure threshold:
decreasing data traffic in the optical link; and
sending an alert comprising the probability of failure, the failure threshold comprising a probability of failure indicative of impending failure of the optical adapter, wherein the alert comprises the time for the corrective action.

* * * * *